US011683382B2

(12) United States Patent
Goto

(10) Patent No.: US 11,683,382 B2
(45) Date of Patent: Jun. 20, 2023

(54) COMMUNICATION DEVICE, METHOD FOR CONTROLLING COMMUNICATION DEVICE, AND PROGRAM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 15/701,980

(22) Filed: Sep. 12, 2017

(65) Prior Publication Data

US 2018/0077255 A1     Mar. 15, 2018

(30) Foreign Application Priority Data

Sep. 15, 2016    (JP) .............................. JP2016-180324

(51) Int. Cl.
| | |
|---|---|
| H04L 67/289 | (2022.01) |
| H04W 4/50 | (2018.01) |
| H04W 76/14 | (2018.01) |
| H04L 9/40 | (2022.01) |
| H04W 12/04 | (2021.01) |
| H04W 12/06 | (2021.01) |
| H04L 41/0806 | (2022.01) |
| H04W 84/12 | (2009.01) |
| H04W 12/77 | (2021.01) |

(52) U.S. Cl.
CPC ............ *H04L 67/289* (2013.01); *H04L 63/20* (2013.01); *H04W 4/50* (2018.02); *H04W 12/04* (2013.01); *H04W 12/06* (2013.01); *H04W 76/14* (2018.02); *H04L 41/0806* (2013.01); *H04W 12/77* (2021.01); *H04W 84/12* (2013.01)

(58) Field of Classification Search
CPC ... H04L 67/289; H04L 63/20; H04L 41/0806; H04W 76/14; H04W 4/50; H04W 12/04; H04W 12/06; H04W 12/00522; H04W 84/12

See application file for complete search history.

(56) References Cited

U.S. PATENT DOCUMENTS

| | | | |
|---|---|---|---|
| 10,230,522 B1 * | 3/2019 | Roths ..................... H04L 9/3226 |
| 10,367,685 B2 * | 7/2019 | Nakajima ............ G06F 16/9554 |
| 2004/0054787 A1 * | 3/2004 | Kjellberg ................ H04L 29/06 |
| | | | 709/228 |
| 2005/0243781 A1 * | 11/2005 | Vesuna ................. H04W 48/08 |
| | | | 370/338 |
| 2008/0008116 A1 * | 1/2008 | Buga ..................... H04L 41/046 |
| | | | 370/328 |

(Continued)

OTHER PUBLICATIONS

Wi-Fi Alliance, "Wi-Fi Alliance, Wi-Fi Device Provisioning Protocol (DPP) DRAFT Technical Specification v0.0.23" pp. 1-89.

*Primary Examiner* — Patrice L Winder
*Assistant Examiner* — Angela M Widhalm De Rodriguez
(74) *Attorney, Agent, or Firm* — Canon U.S.A., Inc., IP Division

(57) ABSTRACT

A communication device determines whether an access point with which connection can be established using information for establishing connection based on a protocol different from Device Provisioning Protocol (DPP) supports the DPP. When it is determined that the access point supports the DPP, Connector for establishing connection with the access point based on the DPP is acquired.

11 Claims, 6 Drawing Sheets

(56) References Cited

U.S. PATENT DOCUMENTS

| | | | |
|---|---|---|---|
| 2010/0052854 A1* | 3/2010 | Jeun | G06F 21/35 340/5.85 |
| 2011/0219427 A1* | 9/2011 | Hito | G06F 21/00 726/3 |
| 2014/0204797 A1* | 7/2014 | Lu | H04W 48/16 370/254 |
| 2014/0282960 A1* | 9/2014 | Tinnakornsrisuphap | H04L 63/083 726/7 |
| 2015/0062625 A1* | 3/2015 | Kong | H04N 1/00342 358/1.15 |
| 2015/0229475 A1* | 8/2015 | Benoit | H04L 63/061 713/168 |
| 2015/0256627 A1* | 9/2015 | Patil | H04L 67/141 709/228 |
| 2016/0066353 A1* | 3/2016 | Kumar | H04W 12/06 709/227 |
| 2016/0128113 A1* | 5/2016 | Qi | H04W 8/005 370/329 |
| 2016/0150412 A1* | 5/2016 | Liu | G06K 9/18 370/338 |
| 2016/0234758 A1* | 8/2016 | Qi | H04W 40/246 |
| 2016/0270020 A1* | 9/2016 | Adrangi | H04L 67/02 |
| 2016/0277370 A1* | 9/2016 | Lee | H04W 12/0023 |
| 2016/0360407 A1* | 12/2016 | Benoit | H04W 12/06 |
| 2017/0078408 A1* | 3/2017 | Lepp | H04L 67/16 |
| 2017/0238164 A1* | 8/2017 | Pang | H04W 8/005 455/41.3 |
| 2017/0245314 A1* | 8/2017 | Oh | H04W 12/08 |
| 2017/0257819 A1* | 9/2017 | McCann | H04W 48/14 |
| 2017/0265238 A1* | 9/2017 | Li | G06F 21/30 |
| 2017/0295448 A1* | 10/2017 | McCann | H04L 63/06 |
| 2017/0353981 A1* | 12/2017 | Lee | H04W 12/08 |
| 2017/0359319 A1* | 12/2017 | Kelsey | H04W 12/0401 |
| 2017/0371602 A1* | 12/2017 | Panda | G06F 3/1204 |
| 2018/0048632 A1* | 2/2018 | Cammarota | H04L 9/321 |
| 2018/0213578 A1* | 7/2018 | Tachibana | H04W 12/04031 |
| 2019/0014531 A1* | 1/2019 | Fang | H04W 48/08 |
| 2019/0377532 A1* | 12/2019 | Garrison | G06F 3/1207 |

* cited by examiner

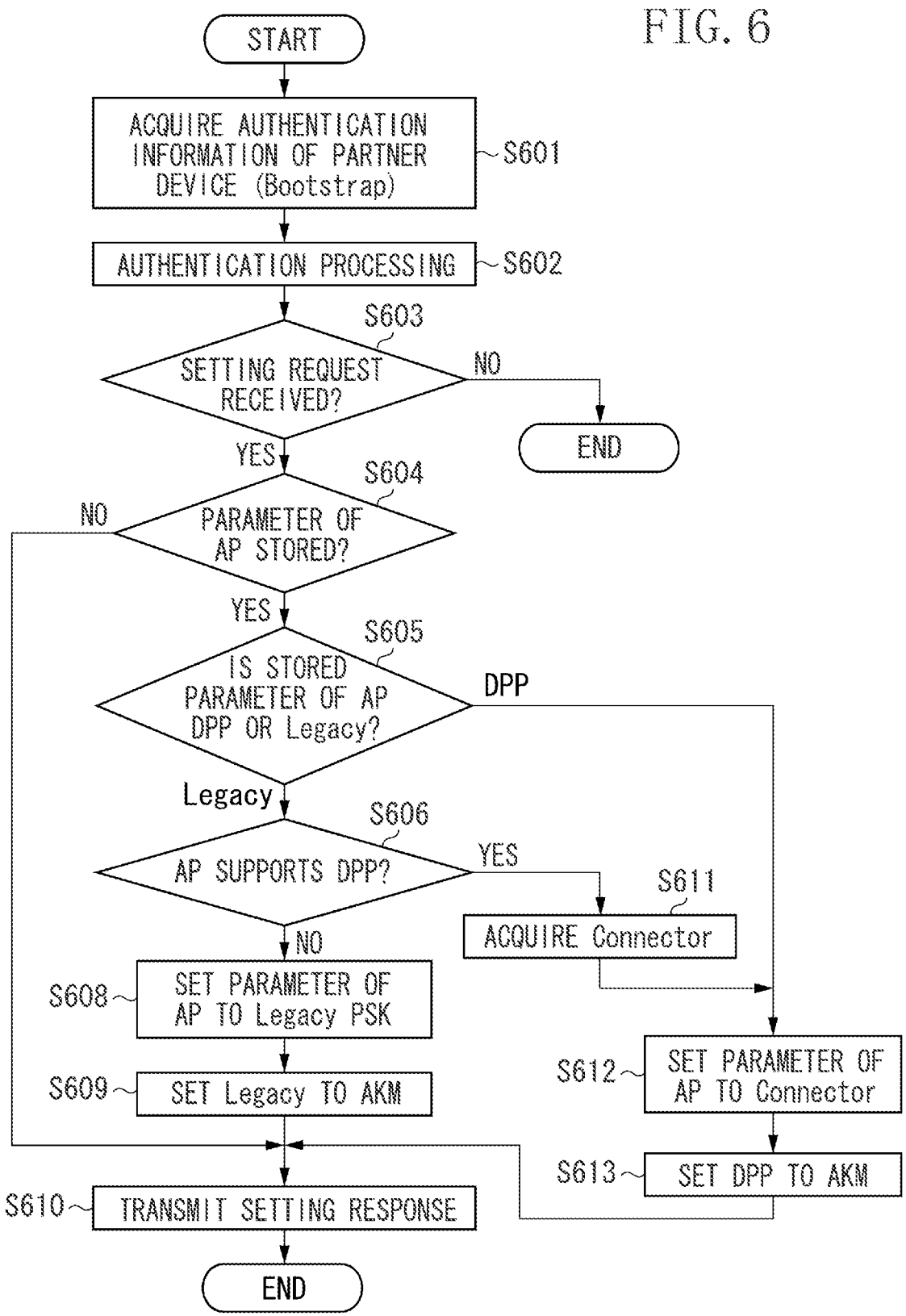

COMMUNICATION DEVICE, METHOD FOR CONTROLLING COMMUNICATION DEVICE, AND PROGRAM

BACKGROUND

Field

The present disclosure relates to a communication technique.

Description of the Related Art

In recent years, electronic devices, such as a digital camera, a printer, a cellular phone/smartphone, with a wireless communication function have been increasingly used while connected to a wireless network.

Various communication parameters, such as an encryption scheme, an encryption key, an authentication scheme, and an authentication key, need to be set to establish connection between an electronic device and a wireless network. A communication parameter setting protocol (Wi-Fi Device Provisioning Protocol, hereinafter referred to as DPP) has been defined as a technique with which the communication parameters can be easily set (Wi-Fi Alliance®, Wi-Fi Device Provisioning Protocol (DPP) DRAFT Technical Specification v0.0.23) (hereinafter, Non-Patent Literature 1). The DPP defines a method for securely setting the communication parameters and executing wireless connection processing with an encrypted public key acquired by using a quick response code (QR Code®).

According to the DPP described in Non-Patent Literature 1, a configurator that provides a communication parameter offers information required for establishing connection with an access point to an enrollee that receives the communication parameter. This information is referred to as Connector. The enrollee executes connection processing with the access point by using Connector provided by the configurator to generate a key used for authentication and communications. According to the DPP described in Non-Patent Literature 1, the configurator can provide Pre-Shared Key (PSK) or Passphrase used for conventional connection processing which does not employ the DPP to the enrollee.

The configurator may not hold Connector used for the DPP and may hold PSK or Passphrase for non-DPP, as a communication parameter for establishing connection with an access point. In such a case, the configurator provides PSK or Passphrase for non-DPP to the enrollee even when the access point supports the DPP. As a result, the enrollee executes the conventional connection processing with the access point by using PSK or Passphrase thus provided. When the access point supports the DPP, the configurator preferably provides Connector for the DPP to the enrollee, so that connection processing based on more secure DPP can be achieved.

SUMMARY

A communication device according to an aspect of the present disclosure includes a storage unit configured to store information for establishing connection with an access point based on a non-Device Provisioning Protocol, a determination unit configured to determine whether the access point with which the connection can be established using the stored information supports the Device Provisioning Protocol, and an acquiring unit configured to acquire Connector for establishing the connection with the access point based on the Device Provisioning Protocol when the determination unit determines that the access point supports the Device Provisioning Protocol.

Further features will become apparent from the following description of exemplary embodiments with reference to the attached drawings.

BRIEF DESCRIPTION OF THE DRAWINGS

FIG. 6 is a flowchart illustrating processing executed by a communication device as a parameter providing device.

DESCRIPTION OF THE EMBODIMENTS

A communication device according to an exemplary embodiment is described with reference to the drawings. A system described below, as an example, uses a wireless local area network (LAN) system based on The Institute of Electrical and Electronics Engineers, Inc. (IEEE) 802.11 series. However, the communication mode is not necessarily limited to the wireless LAN communications based on IEEE802.11.

Figure 3:
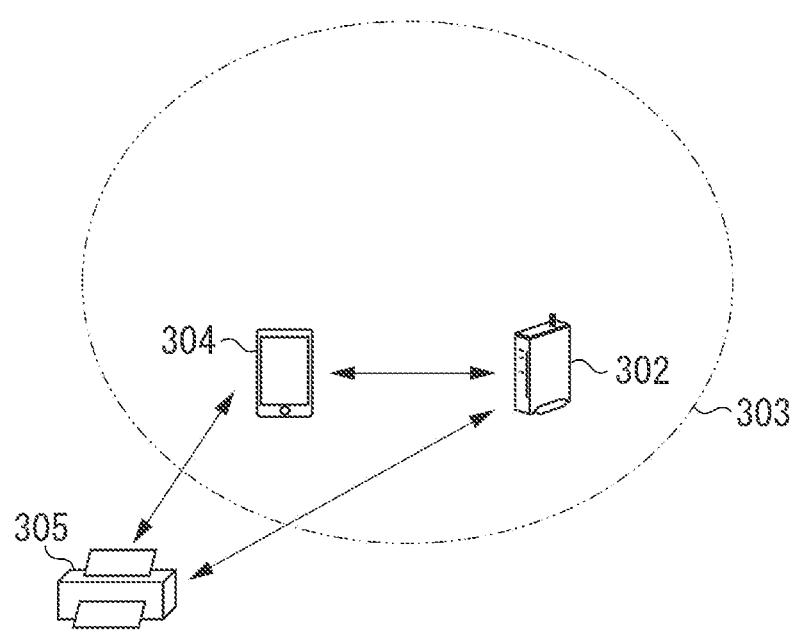
FIG. 3 is a diagram illustrating an example of a configuration of a communication system.

FIG. 3 is a diagram illustrating a configuration of a communication system according to the present exemplary embodiment. The communication system includes an access point 302, a smartphone 304, a printer 305, and a wireless LAN 303 (hereinafter, referred to as a network 303). In processing described below, the printer 305 is added to the network 303 formed by the access point 302. The smartphone 304 operates as a configurator defined in DPP, and provides information for establishing connection with the access point 302 to the printer 305.

The communication system described in the present exemplary embodiment includes the smartphone, the access point, and the printer as its devices. The system can include other devices, such as a cellular phone, a camera, a personal computer (PC), a video camera, a smartwatch, and a personal digital assistant (PDA). In the present description, the number of devices in the communication system is three. However, the number of devices can either be less than or greater than three.

Figure 1:
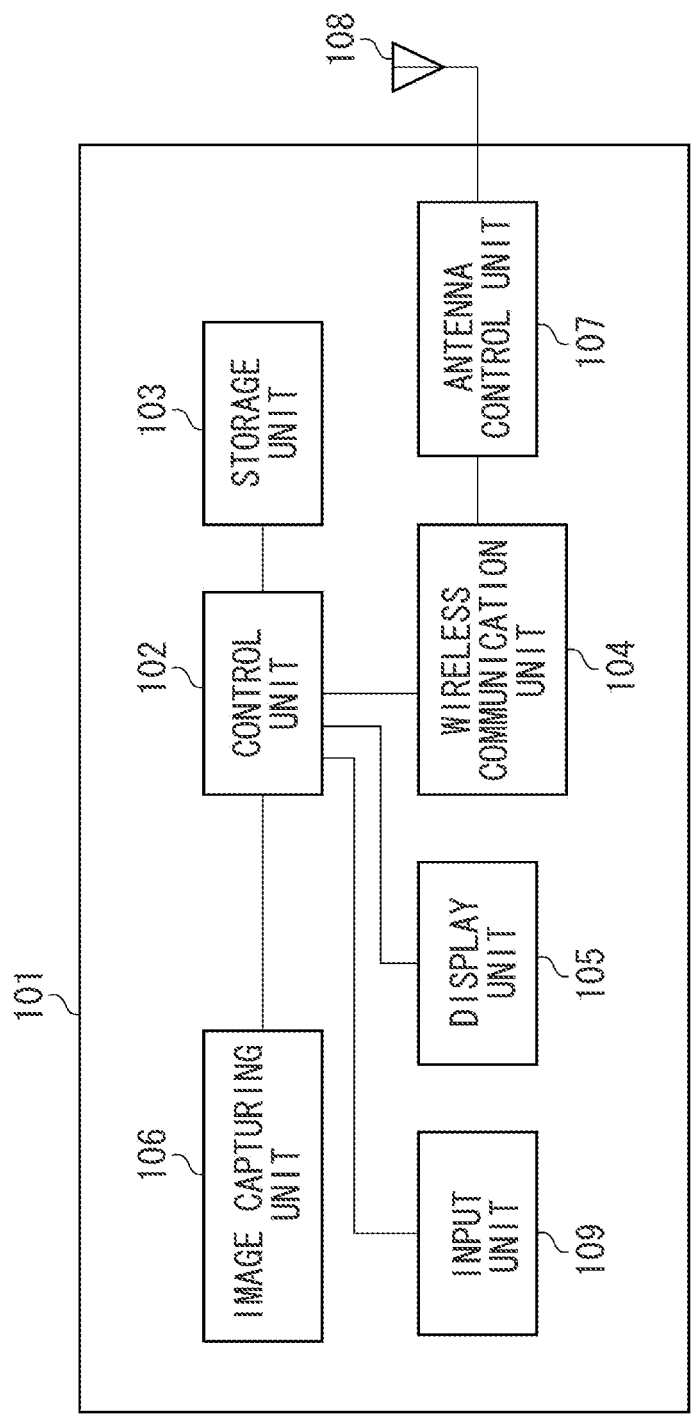
FIG. 1 is a diagram illustrating a hardware configuration of a communication device.

A hardware configuration of a communication device (the access point 302, the smartphone 304, and the printer 305) in the communication system according to the present exemplary embodiment illustrated in FIG. 3 is described with reference to FIG. 1. A communication device 101 illustrated in FIG. 1 includes a control unit 102 that executes a control program stored in a storage unit 103 to control the communication device 101. The control unit 102 includes a central processing unit (CPU). The storage unit 103 stores various types of information including the control program to be executed by the control unit 102, image data, and a communication parameter. The control unit 102 executes the control program stored in the storage unit 103 to implement various types of processing described below. The storage unit 103 includes a storage medium, such as a read only memory (ROM), a random access memory (RAM), hard disk drive (HDD), a flash memory, and a detachable secure digital (SD) card.

A wireless communication unit 104 performs wireless LAN communications based on the IEEE802.11 series. The wireless communication unit 104 includes a chip that performs wireless communications. A display unit 105 performs various types of display and visually outputs recognizable information using a liquid crystal display (LCD) or a light emitting diode (LED) or outputs sounds using a speaker or the like. Thus, the display unit 105 outputs at least one of visual information and sound information. The display unit 105 that displays the visual information includes a Video RAM (VRAM) that stores image data corresponding to the visual information to be displayed. The display unit 105 performs display control in such a manner that the LCD or the LED keeps displaying the image data stored in the VRAM.

An image capturing unit 106 includes an image sensor and a lens, and captures a photograph or a video. The image capturing unit 106 captures an image of a one-dimensional barcode, or a two-dimensional code such as a QR code. An antenna control unit 107 performs output control for an antenna 108. The antenna 108 can perform communications with a 2.4-GHz band and/or 5-GHz band for wireless LAN communication. An input unit 109 is used by a user to perform various inputs for operating the communication device 101. The input unit 109 stores a flag corresponding to the input in a memory, such as the storage unit 103. The hardware configuration illustrating in FIG. 1 is merely an example, and the communication device can have other hardware configurations. For example, the communication device functioning as a printer can include a print unit in addition to the configuration illustrated in FIG. 1. The communication device 101 serving as the access point 302 does not need to include the image capturing unit 106 or the display unit 105.

Figure 2:
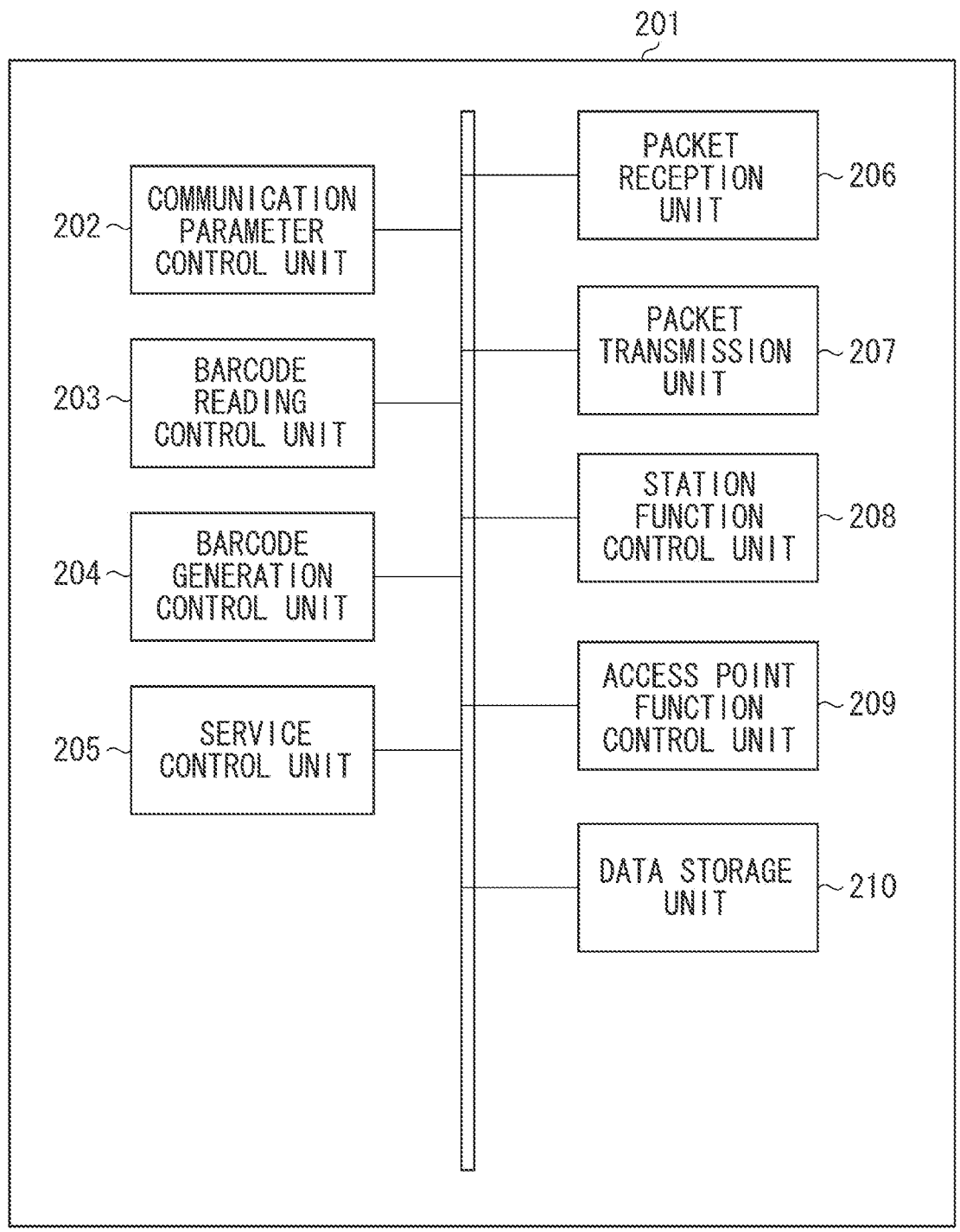
FIG. 2 is a diagram illustrating a software configuration of the communication device.

FIG. 2 is a block diagram illustrating an example of a configuration of software functional blocks for implementing a communication control function described below. The functional blocks of each communication device according to the present exemplary embodiment is stored as a program in the storage unit 103. The control unit 102 executes the program to implement the corresponding function. The control unit 102 controls each piece of hardware and calculates and processes information in accordance with a control program to implement the corresponding function. The functional blocks can partially or entirely be implemented as hardware. In such a case the functional blocks are partially or entirely implemented as, for example, an Application Specific Integrated Circuit (ASIC).

A software functional configuration 201 illustrated in FIG. 2 includes a communication parameter control unit 202. The communication parameter control unit 202 executes communication parameter sharing processing so that a communication parameter can be shared between devices. In the communication parameter sharing processing, a providing device provides a communication parameter for performing wireless communications to a receiver device. The communication parameter includes wireless communication parameters required for performing the wireless LAN communications. The parameters include a Service Set Identifier (SSID) as a network identifier, an encryption scheme, an encryption key, an authentication scheme, and an authentication key. The parameters can further include a connector defined in Device Provisioning Protocol (DPP), a media access control (MAC) address, Pre-Shared Key (PSK), Passphrase, an Internet protocol (IP) address for communicating on the IP layer, and information required for an upper level service. The communication parameter control unit 202 is configured to employ the DPP as the communication parameter sharing processing. However, the communication parameter sharing processing executed by the communication parameter control unit 202 is not limited to the processing based on the DPP, and can be other types of processing such as Wi-Fi Protected Setup (WPS) or Wi-Fi Direct®.

A barcode reading control unit 203 analyzes an image of a one-dimensional barcode or a two-dimensional code, such as a QR code or a Computer Purpose (CP) code, captured by the image capturing unit 106 to acquire code information. The barcode reading control unit 203 makes the image capturing unit 106 capture code information including a public key used for executing the communication parameter sharing processing, and acquires the captured image. The code information may be a two-dimensional code such as a Computer Purpose (CP) code or a QR code, or may be a one-dimensional code such as a barcode. The barcode reading control unit 203 analyzes a captured image of the code information acquired by the image capturing unit 106, and acquires the code information. The code information according to the present exemplary embodiment can include information used in the communication parameter sharing processing. The information used in the communication parameter sharing processing includes a public key used for authentication processing and a device identifier. The public key is information used for performing the communication parameter sharing processing with higher security, and can be information such as a certificate or a password. The public key is one type of encryption key used for public-key cryptosystem.

A barcode generation control unit 204 generates a one-dimensional barcode or a two-dimensional code, such as a QR code, and performs control so that the generated one-dimensional barcode, the two-dimensional code, or the like is displayed on the display unit 105. The barcode generation control unit 204 generates code information including a public key used for executing the communication parameter sharing processing and an identifier of the communication device. A service control unit 205 corresponds to an application layer that is a service providing layer as an upper level layer at or higher than the fifth layer in the Open Systems Interconnection (OSI) model. More specifically, the service control unit 205 executes print processing, image streaming processing, file transfer processing, and the like through wireless communications performed using the wireless communication unit 104.

A packet reception unit 206 and a packet transmission unit 207 control transmission and reception of all packets including communication protocols for an upper layer. The packet reception unit 206 and the packet transmission unit 207 control the wireless communication unit 104 to transmit and receive packets based on the IEEE802.11 standard to and from another device.

A station function control unit 208 provides a station (STA) function for operating as an STA in an infrastructure mode defined in the IEEEE802.11 standard. The STA function control unit 208 executes processing such as authentication and encryption when operating as the STA. An access point function control unit 209 provides an access point (AP) function for operating as an AP in the infrastructure mode defined in the IEEE802.11 standard. The AP function control unit 209 forms a wireless network, and performs management of the authentication/encryption processing for the STA, management of the STA, or the like. A data storage unit 210 controls writing and reading software itself, a communication parameter, and information such as barcodes, to and from the storage unit 103. When the communication device 101 serves as the access point 302, the barcode reading control unit 203 can be omitted.

Processing executed in the communication system with the above-described configuration will now be described. The network 303 is formed by the access point 302, and the smartphone 304 stores a communication parameter with which the connection with the access point 302 can be established. The smartphone 304 can use a known protocol such as Wi-Fi Protected Setup™ or an AirStation One-Touch Secure System™ to acquire the communication parameter. When the access point 302 supports the DPP, DPP-based automatic setting can be employed. Alternatively, a user can manually input the parameter through the input unit 109.

Figure 4:
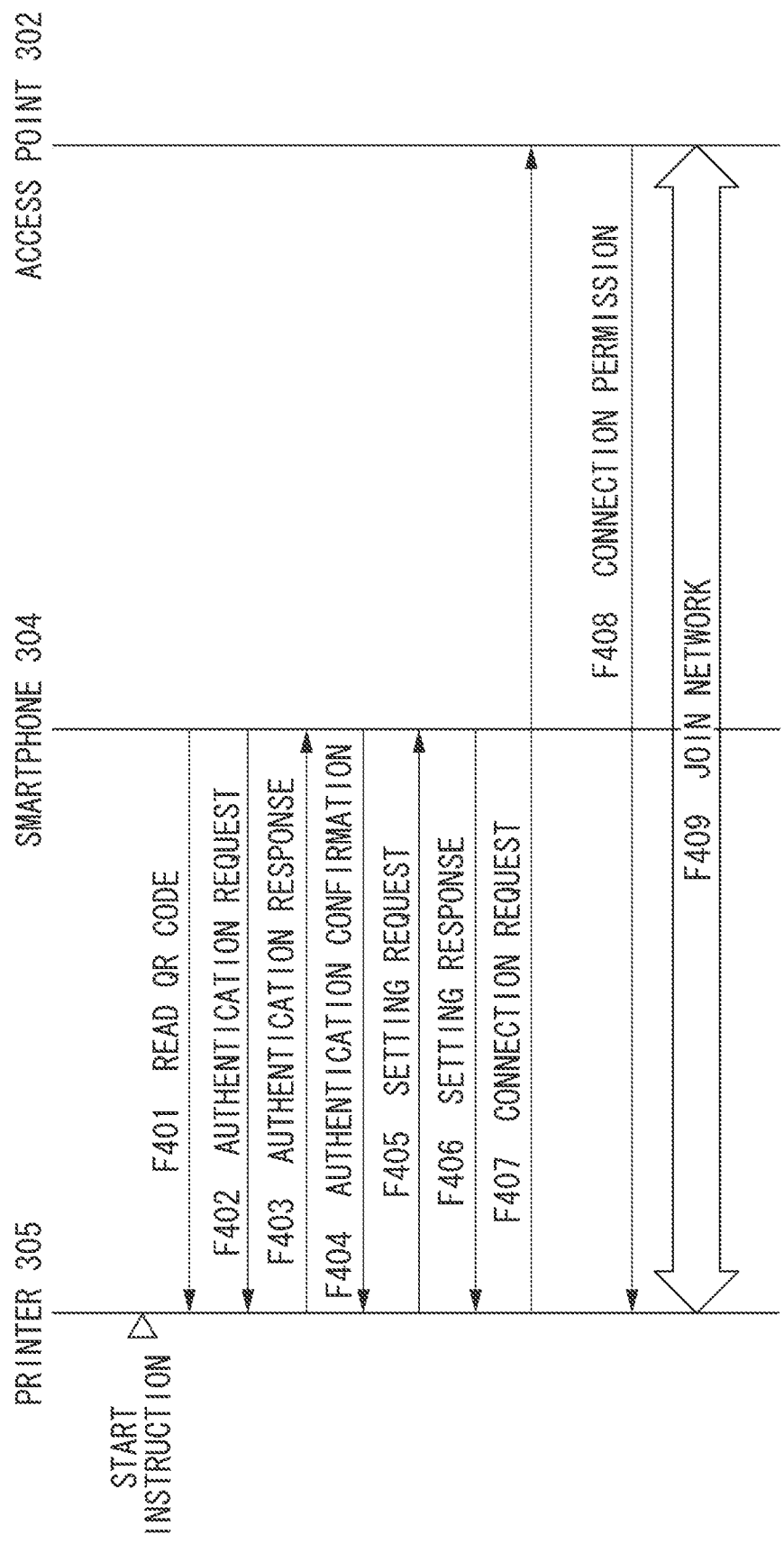
FIG. 4 is a diagram illustrating a sequence of operations between communication devices.

FIG. 4 illustrates a sequence of operations in connection processing based on the DPP that are executed among the access point 302, the smartphone 304, and the printer 305. In F401, the smartphone 304 captures an image of a QR code displayed on the printer 305 that received a processing start instruction from the user and acquires authentication information from the QR code. The authentication information acquired in F401 can be a public key. The smartphone 304 uses the authentication information acquired from the QR code to generate identification information used for authentication processing described below. The smartphone 304 calculates a hash value for the public key in the QR code to obtain the identification information. After calculating the identification information, in F402, the smartphone 304 transmits an authentication request signal to the printer 305. More specifically, in F402, the smartphone 304 transmits the authentication request signal including the generated identification information to the printer 305. The authentication request signal is a signal for requesting for authentication processing. Here, Action frame defined in the 802.11 series is used for the authentication request signal.

Upon receiving the authentication request signal, the printer 305 executes authentication processing based on the identification information calculated from the public key and the identification information included in the signal. More specifically, the printer 305 determines whether the identification information in the received authentication request signal matches the calculated identification information. The printer 305 transmits an authentication response signal indicating whether the authentication processing has succeeded. In the present case, the authentication processing has succeeded. In F403, the printer 305 transmits an authentication response signal indicating that the authentication has succeeded to the smartphone 304 when the identification information in the received authentication request signal matches the calculated identification information. The authentication response signal includes information requiring the transmitter of the authentication request signal to execute the authentication processing. For example, the authentication response signal includes the identification information calculated by the transmitter of the authentication response signal.

Upon receiving the authentication response signal, the smartphone 304 executes the authentication processing based on the information included in the authentication response signal. The smartphone 304 can perform the authentication by determining whether the identification information included in the received authentication response signal matches the identification information generated based on the information obtained from the QR code. The smartphone 304 can generate a symmetric-key based on the information included in the authentication response signal or can acquire the symmetric-key from the authentication response signal.

When the authentication succeeds, in F404, the smartphone 304 transmits an authentication confirmation signal indicating that the authentication has succeeded to the printer 305. Upon receiving the authentication confirmation signal, in F405, the printer 305 transmits a setting request signal to request for a communication parameter to the smartphone 304. Upon receiving the setting request signal, in F406, the smartphone 304 transmits a setting response signal including the communication parameter to the printer 305. The communication parameter is transmitted in an encrypted state using the symmetric-key shared in the authentication processing. The setting response signal can be DPP Configuration Response frame defined in DPP.

Figure 5:
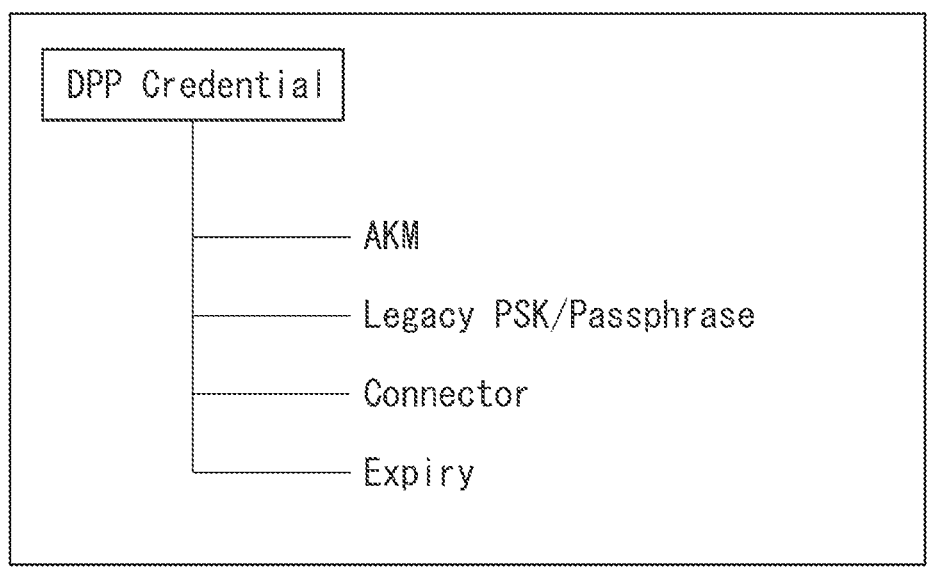
FIG. 5 is a diagram illustrating a configuration of a communication parameter.

FIG. 5 illustrates the communication parameter transmitted in F406 using DPP, according to Non-Patent Literature 1. More specifically, in an overall configuration of DPP Credential, AKM (Authentication and Key Management Type), Legacy PSK/Passphrase, Connector, Expiry, and the like are set. AKM is a value indicating an authentication protocol and a key exchange algorithm used for the communications. Legacy PSK/Passphrase is an encryption key for executing authentication/key exchange based on the conventional WPA (Wi-Fi Protected Access®) or IEEE802.11. More specifically, Legacy PSK/Passphrase is information for connecting to the wireless network formed by the access point based on a protocol different from the DPP. Connector includes various types of information used for the authentication protocol and the key exchange algorithm defined in the DPP. Thus, Connector is information used for connecting to the wireless network formed by the access point based on the DPP.

Upon receiving the setting response signal, in F407, the printer 305 transmits a connection request signal for connecting to the network 303 based on the communication parameter in the setting response signal to the access point 302. The printer 305 transmits a connection request signal based on the DPP to the access point 302 when AKM of the received setting response signal includes a value indicating the DPP.

The connection request signal based on the DPP includes Connector. Connector includes management device information at least indicating that the smartphone 304 is the device (configurator) that provided the communication parameter. When the connection request signal is received, the access point 302 compares the management device information in the signal with a management device list stored therein to check whether the same device (smartphone 304) has been registered. When it is confirmed that the device has been registered, in F408, the access point 302 transmits a connection permission signal that permits the connection of the printer 305 to the printer 305. The connection request signal from the printer 305 can include a communication parameter, such as an encryption key, acquired from the smartphone 304. The access point 302 can check whether the encryption key in the connection request signal matches the encryption key required for the communication over the network 303, and can transmit the connection permission signal when the keys match.

The printer 305 executes connection processing based on the conventional WPA or IEEE802.11 when AKM of the received setting response signal includes information indicating Legacy. In addition, the printer 305 executes the connection processing based on the conventional WPA or IEEE802.11 when the received setting response signal includes information indicating that Connector is invalid. In such a case, upon receiving the setting response signal, the printer 305 executes the connection processing using Legacy PSK/Passphrase included in the setting response signal.

When the connection permission signal is received, in F409, the printer 305 executes required connection processing, such as 4-Way Handshake, with the access point 302 to join the network 303.

Next, a flow of processing executed by the smartphone 304 is described with reference to FIG. 6. Steps in the flowchart illustrated in FIG. 6 are implemented by the control unit 102 executing a control program stored in the storage unit 103 of the smartphone 304. The steps in the flowchart illustrated in FIG. 6 can be partially or entirely implemented using hardware, such as an ASIC.

The flowchart in FIG. 6 starts when the smartphone 304 receives an instruction for starting the communication parameter sharing processing from the user via the input unit 109. In step S601 (F401), the smartphone 304 captures an image of the QR code to acquire a public key as the authentication information of the printer 305, which is a partner device. Acquiring the authentication information is not limited to the method using the QR code. The authentication information can be acquired in other ways, such as Near Field Communication (NFC), Bluetooth®, a universal serial bus (USB), a character string input by a user, or other like ways. In the DPP, the acquisition of the authentication information is defined with a term Bootstrap.

Next, in step S602, the smartphone 304 executes the authentication processing in F402 to F404 described with reference to FIG. 4. The processing is terminated when the smartphone 304 fails the authentication processing. When the authentication processing succeeds, in step S603 (F405), the smartphone 304 determines whether the setting request signal has been received from the printer 305. When the smartphone 304 does not receive the setting request signal from the printer 305 (NO in step S603), the processing is terminated.

When the smartphone 304 receives the setting request signal from the printer 305 (YES in step S603), the processing proceeds to step S604. In step S604, the smartphone 304 determines whether the storage unit thereof stores the communication parameter of the access point 302. When it is determined in step S604 that the communication parameter of the access point 302 is not stored in the smartphone 304 (NO in step S604), the processing proceeds to step S610. In step S610, the smartphone 304 transmits a setting response signal to notify an error to the printer 305, and the processing is terminated. The setting response signal thus transmitted includes information indicating the error.

When a result of the determination in step S604 indicates that the communication parameter of the access point 302 is stored (Yes in step S604), the processing proceeds to step S605. In step S605, the smartphone 304 determines whether a parameter of the access point, which is provided next, corresponds to the DPP. More specifically, the smartphone 304 determines whether the communication parameter stored therein is Connector corresponding to the DPP or a parameter corresponding to the WPA or IEEE802.11 (hereinafter, referred to as Legacy). When a result of the determination in step S605 indicates that the stored communication parameter corresponds to the DPP (DPP in step S605), the processing proceeds to step S612. In step S612, the smartphone 304 sets the information to an area of the setting response signal for transmission where Connector is to be stored. Then, in step S613, the smartphone 304 sets a value indicating the DPP to an area of the setting response signal to be transmitted where AKM is to be stored.

When a result of the determination in step S605 indicates that the stored communication parameter corresponds to Legacy (Legacy in step S605), the processing proceeds to step S606. In step S606, the smartphone 304 determines whether the access point 302 supports the DPP. The determination in step S606 can be made based on communications using Action frame defined in the 802.11 series. The smartphone 304 can transmit and receive the signals illustrated in FIG. 4 to and from the access point 302 to determine whether the access point 302 supports the DPP. The smartphone 304 can transmit and receive packets other than the signals illustrated in FIG. 4 to determine whether the access point 302 supports the DPP. The access point 302 can add information indicating whether the DPP is supported, to Beacon, Probe Response, or the like so that the smartphone 304 can make a determination based on such information. The smartphone 304 can establish connection with the access point 302 using a communication parameter corresponding to Legacy stored therein, and ask the access point 302 for the DPP supporting status.

When it is determined in step S606 that the access point 302 supports the DPP (YES in step S606), the processing proceeds to step S611. In step S611, the smartphone 304 acquires Connector as the communication parameter of the access point 302 supporting the DPP. In step S611, Connector can be acquired from the access point 302 by connecting with the access point 302 using the stored communication parameter corresponding to Legacy. Alternatively, the smartphone 304 can acquire Connector by using Action frame defined in the 802.11 series. The smartphone 304 can acquire Connector by transmitting and receiving the signals illustrated in FIG. 4 to and from the access point 302. The smartphone 304 can determine whether the access point 302 supports the DPP, by transmitting and receiving packets other than the signals illustrated in FIG. 4. The access point 302 can add Connector to Beacon, Probe Response, or the like and the smartphone 304 can acquire Connector therefrom. The smartphone 304 can establish connection with the access point 302 using the communication parameter corresponding to Legacy stored therein, and ask the access point 302 for the DPP supporting status. Alternatively, the smartphone 304 can acquire information about another configurator from the access point 302, and acquire Connector of the access point 302 from another configurator based on the DPP.

After Connector is acquired in step S611, the processing proceeds to step S612. In step S612, the smartphone 304 sets the information to an area of the setting response signal for transmission where Connector is to be stored. Then, in step S613, the smartphone 304 sets the value indicating the DPP, to the area of the setting response signal for transmission where AKM is to be stored.

When it is determined in step S606 that the access point 302 does not support the DPP (NO in step S606), the processing proceeds to step S608. In step S608, the smartphone 304 sets the communication parameter stored therein to an area of a setting response signal for transmission where Legacy PSK/Passphrase is to be stored.

Next, in step S609, the smartphone 304 sets a value indicating Legacy to AKM. Then, in step S610 (F406), the smartphone 304 transmits the setting response signal generated after the processing in step S609 or S613, to the printer 305, and the processing is terminated.

In the present exemplary embodiment as described above, when the access point 302 with which the connection can be established using the communication parameter for non-DPP stored in the smartphone 304 supports DPP, the smartphone 304 can acquire Connector from the access point 302. Thus, the smartphone 304 can provide Connector, with which connection can be established with higher security, to the printer 305 as an enrollee. Thus, the printer 305 can establish connection with the access point 302 with higher security.

Other Embodiments

In the configuration according to the above-described exemplary embodiment, information for setting a communication parameter can be exchanged between devices using an image of a QR code. Alternatively, wireless communications such as NFC or Bluetooth can be employed instead of capturing an image of the QR code. Wireless communications such as IEEE802.11ad or TransferJet® can also be employed.

The QR code to be read is not limited to a QR code displayed on the display unit, and can be a QR code in the form of a sticker or the like adhered to a communication device's casing. The QR code to be read can also be attached to a communication device's manual or a packaging material, such as a cardboard box, containing the communication device. A one-dimensional barcode or a two-dimensional code other than a QR code can be employed instead of a QR code. Information in a user readable form can be employed instead of information, such as a QR code, in machine readable form.

In the configuration according to the above-described exemplary embodiments, the devices communicate with each other through wireless LAN communication based on IEEE802.11. However, this is not seen to be limiting. For example, the communication can be performed with a wireless communication medium such as Ultra Wide Band (UWB), Bluetooth, ZigBee, or NFC. The UWB includes wireless USB, wireless 1394, and WiMedia Network (Wi-NET).

One or more functions of the above-described exemplary embodiment can be implemented by supplying a program to a system or a device via a network or a storage medium, and reading and executing the program by one or more processors of a computer in the system or the device. The one or more functions can also be implemented by a circuit, such as an ASIC).

In the present disclosure, when an access point with which connection can be established using information for making connection based on a protocol different from DPP supports the DPP, Connector for making connection based on the DPP can be acquired from the access point.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-180324, filed Sep. 15, 2016, which is hereby incorporated by reference herein in its entirety.

What is claimed is:

1. A communication device configured to provide a communication parameter for wirelessly connecting to an access point to a first other communication device that is different from the access point, the first other communication device being an Enrollee defined in Device Provisioning Protocol, the communication device being also different from the access point, the communication device being a first configurator that operates as a Configurator defined in the Device Provisioning Protocol, the communication device comprising:
    an acquiring unit configured to acquire, from a second other communication device which is also different from the access point, the second other communication device being a second configurator that operates as the Configurator defined in the Device Provisioning Protocol, information to be used for providing a communication parameter to the first other communication device, by receiving DPP Configurator Response defined in the Device Provisioning Protocol, wherein the information is acquired from the second other communication device in order to provide Connector defined in the Device Provisioning Protocol to the first other communication device by transmitting DPP Configuration Response defined in the Device Provisioning Protocol; and
    a transmitting unit configured to transmit the DPP Configuration Response defined in the Device Provisioning Protocol, with the Connector included therein, to the first other communication device so as to enable the first other communication device to establish the wireless connection with the access point that is different from the communication device and different from the second other communication device.

2. The communication device according to claim 1, wherein the acquiring unit is configured to acquire the information after an instruction to provide a communication parameter for establishing a wireless connection with the access point to the first other communication device.

3. The communication device according to claim 1, further comprising an image capturing unit configured to capture an image, wherein the transmitting unit is configured to provide the Connector to the first other communication device in a case where the first other communication device is successfully authenticated based on authentication information acquired from the image captured by the image capturing unit.

4. The communication device according to claim 1, further comprising:
a determination unit configured to determine whether the access point supports a Wi-Fi Device Provisioning Protocol;
wherein the acquiring unit acquires the information by receiving the DPP Configuration Response defined in the Device Provisioning Protocol from the second other communication device to provide the Connector to the first other communication device in a case where the determination unit determines that the access point supports the Device Provisioning Protocol.

5. The communication device according to claim 4, further comprising a storage unit is configured to store information acquired through Wi-Fi Protected Setup, AirStation One-Touch Secure System, or user input, wherein the transmitting unit is configured to provide the stored information to the first other communication device in a case where the determination unit does not determine that the access point supports the Device Provisioning Protocol.

6. The communication device according to claim 5, wherein the stored information is Pre-Shared Key (PSK) or Passphrase used for establishing wireless connection based on Wi-Fi Protected Access® or IEEE802.11.

7. The communication device according to claim 4, wherein the determination unit is configured to make the determination based on a communication with Action frame, Beacon, or Probe Response defined in an IEEE802.11 series.

8. The communication device according to claim 1, wherein the transmitting unit transmits the DPP Configuration Response defined in the Device Provisioning Protocol, with Connector and an Authentication and Key Management Type (AKM) defined in the Device Provisioning Protocol included therein to the first other communication device.

9. The communication device according to claim 8, wherein at least one of a value indicating the Device Provisioning Protocol or a value indicating a legacy is settable for the AKM.

10. A method for controlling a communication device to provide a communication parameter for wirelessly connecting to an access point to a first other communication device that is different from the access point, the first other communication device being an Enrollee defined in Device Provisioning Protocol, the communication device being also different from the access point, the communication device being a first configurator that operates as a Configurator defined in the Device Provisioning Protocol, the method comprising:
acquiring from a second other communication device, which is also different from the access point, the second other communication device being a second configurator that operates as the Configurator defined in the Device Provisioning Protocol, information to be used for providing a communication parameter to the first other communication device, by receiving DPP Configurator Response defined in the Device Provisioning Protocol, wherein the information is acquired from the second other communication device in order to provide Connector defined in the Device Provisioning Protocol to the first other communication device by transmitting DPP Configuration Response defined in the Device Provisioning Protocol; and
transmitting the DPP Configuration Response defined in the Device Provisioning Protocol, with the Connector included therein, to the first other communication device so as to enable the first other communication device to establish the wireless communication with the access point that is different from the communication device and different from the second other communication device.

11. A computer-readable storage medium storing a program for causing a computer to execute a method for controlling a communication device to provide a communication parameter for wirelessly connecting to an access point to a first other communication device that is different from the access point, the first other communication device being an Enrollee defined in Device Provisioning Protocol, the communication device being also different from the access point, the communication device being a first configurator that operates as a Configurator defined in the Device Provisioning Protocol, the method comprising:
acquiring from a second other communication device, which is also different from the access point, the second other communication device being a second configurator that operates as the Configurator defined in the Device Provisioning Protocol, information to be used for providing a communication parameter to the first other communication device, by receiving DPP Configuration Response defined in the Device Provisioning Protocol, wherein the information is acquired from the second other communication device in order to provide Connector defined in the Device Provisioning Protocol to the first other communication device by transmitting DPP Configuration Response defined in the Device Provisioning Protocol; and
transmitting the DPP Configuration Response defined in the Device Provisioning Protocol, with the Connector included therein, to the first other communication device in a case where it is determined that the access point supports the Device Provisioning Protocol so as to enable the first other communication device to establish the wireless connection with the access point that is different from the communication device and different from the second other communication device.

* * * * *